United States Patent
Wojcik et al.

(10) Patent No.: US 9,863,416 B2
(45) Date of Patent: Jan. 9, 2018

(54) TRIANGULAR PUMP COVER

(71) Applicant: Hamilton Sundstrand Corporation, Charlotte, NC (US)

(72) Inventors: Craig J. Wojcik, Frankfort, IL (US); Andrew P. Grosskopf, Rockford, IL (US)

(73) Assignee: Hamilton Sundstrand Corporation, Windsor Locks, CO (US)

(*) Notice: Subject to any disclaimer, the term of this patent is extended or adjusted under 35 U.S.C. 154(b) by 266 days.

(21) Appl. No.: 14/846,192

(22) Filed: Sep. 4, 2015

(65) Prior Publication Data

US 2017/0067461 A1 Mar. 9, 2017

(51) Int. Cl.

| F04C 2/344 | (2006.01) |
|---|---|
| F01C 21/10 | (2006.01) |
| F04C 11/00 | (2006.01) |
| F04C 14/02 | (2006.01) |
| F04C 13/00 | (2006.01) |
| H02K 7/18 | (2006.01) |
| F04C 15/00 | (2006.01) |

(52) U.S. Cl.
CPC .............. F04C 2/344 (2013.01); F01C 21/10 (2013.01); F04C 11/003 (2013.01); F04C 13/008 (2013.01); F04C 14/02 (2013.01); H02K 7/1823 (2013.01); F04C 15/0073 (2013.01); F04C 2210/206 (2013.01); F04C 2230/603 (2013.01); F04C 2240/30 (2013.01); F04C 2240/80 (2013.01); F04C 2240/805 (2013.01)

(58) Field of Classification Search
CPC F01C 21/10; F04C 2230/603; F04C 2240/30; F04C 2240/805; F04C 11/003; F04C 14/02; H02K 7/1823
See application file for complete search history.

(56) References Cited

U.S. PATENT DOCUMENTS

| 4,252,035 A | 2/1981 | Cordner et al. |
| 4,284,913 A | 8/1981 | Barnhardt |
| 4,734,590 A | 3/1988 | Fluegel |
| 4,953,663 A | 9/1990 | Sugden |
| 5,028,803 A | 7/1991 | Reynolds |
| 7,367,782 B2 * | 5/2008 | Kajita .................... F01C 21/108 417/206 |
| 8,549,896 B2 * | 10/2013 | Kobayashi .............. F01C 21/10 418/228 |
| 8,556,577 B2 * | 10/2013 | Bell ....................... F01C 21/007 415/122.1 |
| 2006/0228246 A1 * | 10/2006 | West ..................... F01C 21/106 418/149 |
| 2013/0288840 A1 | 10/2013 | Grosskopf et al. |
| 2014/0007741 A1 | 1/2014 | Vanderzyden et al. |
| 2014/0008170 A1 | 1/2014 | Vanderzyden et al. |
| 2014/0009125 A1 | 1/2014 | Vanderzyden et al. |
| 2014/0009126 A1 | 1/2014 | Vanderzyden et al. |
| 2015/0337835 A1 * | 11/2015 | Sakata .................... F01C 21/10 418/116 |

\* cited by examiner

*Primary Examiner* — Mary A Davis
(74) *Attorney, Agent, or Firm* — Kinney & Lange, P.A.

(57) ABSTRACT

A cover with a center axis for a pump assembly includes a plate. A center hole is formed in the plate and positioned on the center axis of the cover. A first edge of the plate extends between a first lobe and a second lobe, a second edge of the plate extends between the first lobe and a third lobe, and a third edge of the plate extends between the second lobe and the third lobe. The first, second, and third lobes each comprise a mounting boss with a thru-hole.

11 Claims, 5 Drawing Sheets

TRIANGULAR PUMP COVER

BACKGROUND

This disclosure is directed generally to an integrated drive generator for use with an aircraft gas turbine engine, and more specifically, to an oil pump assembly of an integrated drive generator.

Integrated drive generators have been in use for many years in generating electrical power on airframes. An integrated drive generator functions to produce a constant three-phase 400 Hz alternating current when driven by a variable speed gearbox located on an airframe propulsion engine, generally a gas turbine engine. The integrated drive generator is a single unit that includes a hydraulic speed trimming device and an alternating current generator mounted within a case assembly. The hydraulic speed trimming device converts a variable speed shaft input from a gearbox on a gas turbine engine to a constant speed shaft output to drive the alternating current generator.

The integrated drive generator also generally includes a scavenge pump, an inversion pump, and a charge pump disposed within the case assembly of the integrated drive generator. The scavenge pump draws oil from an oil sump located in the bottom of the case and supplies the oil to a filter which removes various debris within the oil prior to entering the cooling circuit located external to the integrated drive generator on the aircraft. The output of the deaerator, which contains oil of higher quality than that pumped by the scavenge pump, is applied to the intake of the charge pump. The charge pump pressurizes the oil and applies the oil to an oil circuit. The oil circuit supplies oil to the hydraulic speed trimming device, to the alternating current generator for cooling and lubricating the alternating current generator, to the casing of the integrated drive generator for cooling, and to other components of the integrated drive generator that require oil circulation for cooling and/or lubrication. Generally, an assembly of gears is used to mechanically connect the scavenge pump, the inversion pump, and charge pump to the output of the hydraulic speed trimming device.

Should any part of the integrated drive generator require maintenance or replacement, an operator generally must open the case assembly and at least partially disassemble the integrated drive generator. Reducing the complexity of the integrated drive generator results in maintenance cost savings by reducing the amount of parts to maintain within the integrated drive generator and the amount of time required to disassemble and reassemble the integrated drive generator. Reducing the complexity of the integrated drive generator also results in manufacturing cost savings by reducing the number of parts needed to produce the integrated drive generator and the time required to assemble the integrated drive generator.

SUMMARY

In one aspect of the invention, a cover with a center axis for a pump assembly includes a plate. A center hole is formed in the plate and positioned on the center axis of the cover. A first edge of the plate extends between a first lobe and a second lobe, a second edge of the plate extends between the first lobe and a third lobe, and a third edge of the plate extends between the second lobe and the third lobe. The first, second, and third lobes each comprise a mounting boss with a thru-hole.

In another aspect of the invention, a pump assembly includes a tubular body extending from a first end to a second end along a center axis, the first end of the tubular body being open. A plurality of pumps is disposed within the tubular body. The pump assembly also includes a cover connected to the first end. The cover includes a plate and a center hole formed in the plate and positioned on the center axis of the tubular body. A first edge of the plate extends between a first lobe and a second lobe, and a second edge of the plate extends between the first lobe and a third lobe. A third edge of the plate extends between the second lobe and the third lobe. The first, second, and third lobes each comprise a mounting boss.

Persons of ordinary skill in the art will recognize that other aspects and embodiments of the present invention are possible in view of the entirety of the present disclosure, including the accompanying figures.

Figure 1:
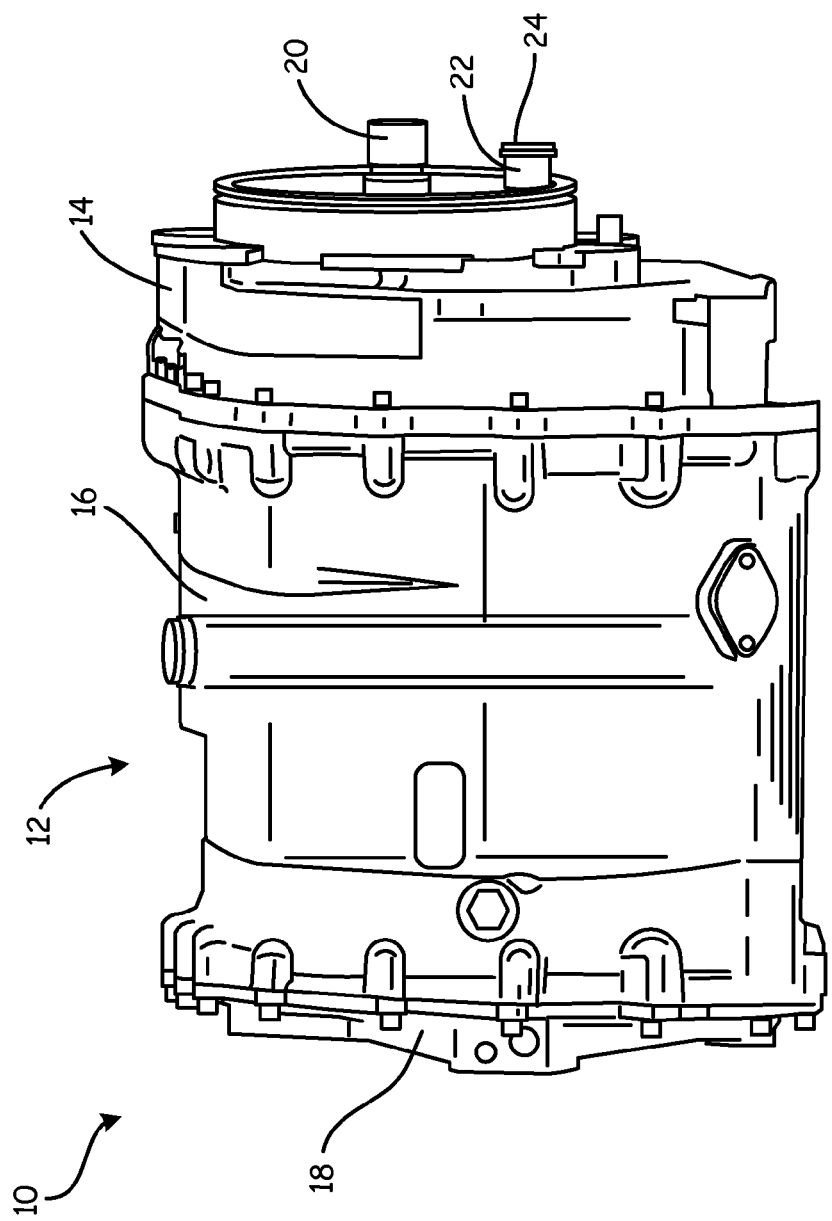
FIG. 1 is a perspective view of an integrated drive generator.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides an integrated drive generator for use with a gas turbine engine. The integrated drive generator includes a pump assembly with a pump cover and a pump sleeve that house a charge pump, a scavenge pump, and an inversion pump within the integrated drive generator. The pump cover and pump sleeve simplify the assembly of the integrated drive generator by congregating the charge pump, the scavenge pump, and the inversion pump into a single unit that requires fewer attachment components than prior art assemblies to connect the charge pump, the scavenge pump, and the inversion pump within the integrated drive generator. Furthermore, aligning the charge pump, the scavenge pump, and the inversion pump within the pump sleeve and the pump cover provides for fewer gears and other provisions for mounting the gears within the integrated drive generator. Reducing the number of gears and other parts within integrated drive generator increases the service life of integrated drive generator by reducing the amount of internal vibration, moving components, and the wear and tear associated with internal vibration.

Figure 2:
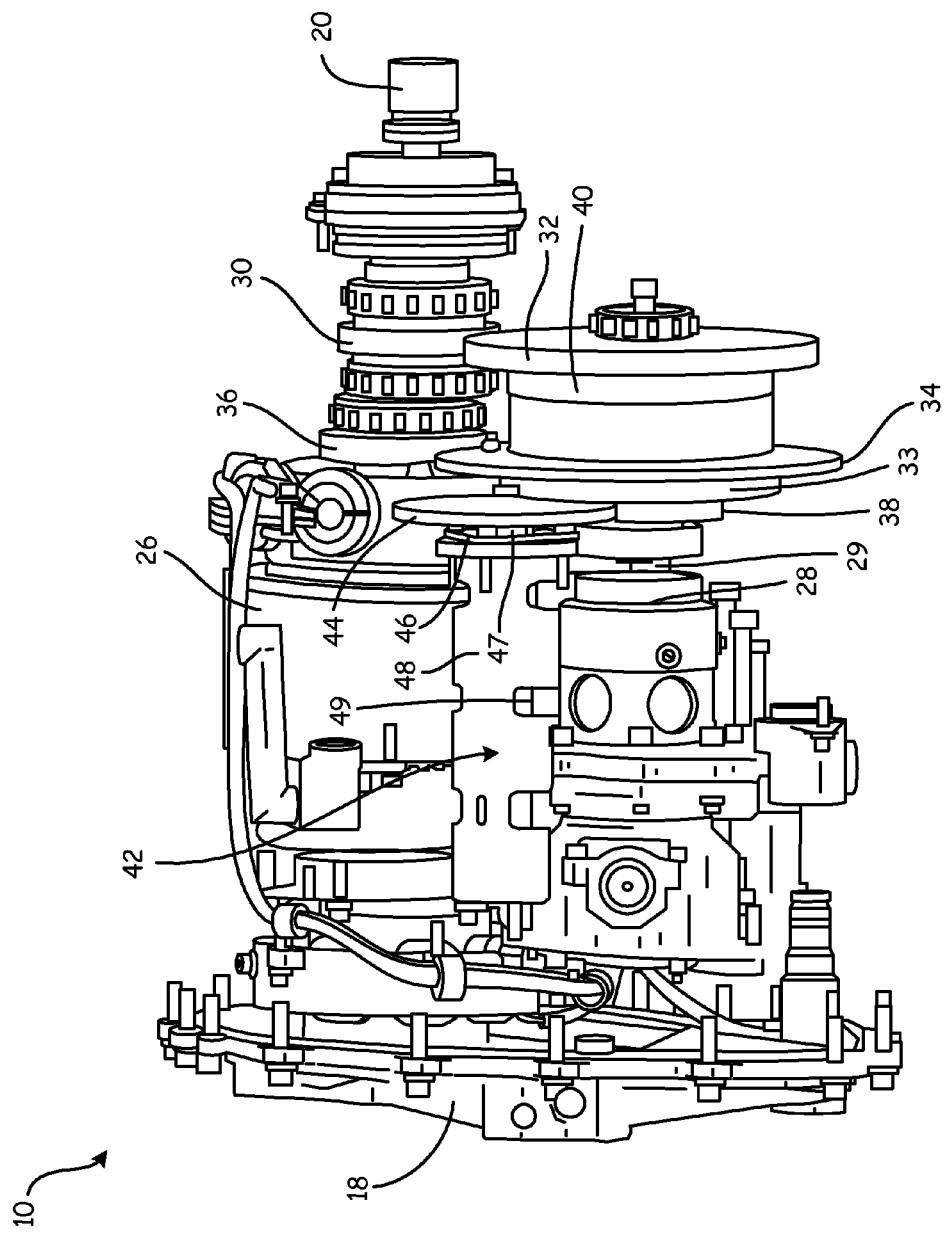
FIG. 2 is a perspective view of the integrated drive generator of FIG. 1 with a housing assembly removed.

FIGS. 1-2 will be discussed concurrently. FIG. 1 is a perspective view of integrated drive generator (IDG) 10 with housing assembly 12. As shown in FIG. 1, housing assembly 12 can include input housing 14, center housing 16, and end housing 18. FIG. 2 is a perspective view of IDG 10 of FIG. 1 with input housing 14 and center housing 16 of housing assembly 12 removed. In addition to housing assembly 12, IDG 10 can also include variable speed input shaft 20, oil outlet 22, oil inlet 24, generator 26, hydraulic speed trimming device 28, input drive gear 30, input driven gear 32, output ring gear 34, generator driven gear 36, accessory drive gear 38, differential 40, and pump assembly 42. Pump assembly 42 can include pump gear 44, pump cover 46, pump drive shaft 47, pump sleeve 48, and pump interior components 49.

Generator 26, hydraulic speed trimming device 28, and pump assembly 42 are all contained within housing assembly 12. As shown in FIG. 1, housing assembly 12 is assembled around generator 26, hydraulic speed trimming device 28 and pump assembly 42 by connecting center housing 16 between input housing 14 and end housing 18. Variable speed input shaft 20 extends across input housing 14 and into the interior of IDG 10. An end of variable speed input shaft 20, disposed outside of housing assembly 12, interfaces with a gearbox on a gas turbine engine such that the gearbox on the gas turbine engine rotates variable speed input shaft 20 at a variable speed. Input drive gear 30 is disposed within housing assembly 12 and is mechanically connected to variable speed input shaft 20 such that variable speed input shaft 20 rotates input drive gear 30 at a variable speed. Input driven gear 32 is disposed within housing assembly 12 and is meshed with input drive gear 30 such that input drive gear 30 rotates input driven gear 32 at a variable speed. As input drive gear 30 rotates input driven gear 32, input driven gear 32 causes a rotation to (not shown), internal to differential 40, which rotates a variable coaxial shaft (not shown) of hydraulic speed trimming device 28 at a variable speed. Hydraulic speed trimming device 28 uses the variable input speed of the variable coaxial shaft (not shown) to trim the variable speed which results in the fixed coaxial shaft 29 rotating to adjust the speed of a sun gear (not shown). The sun gear (not shown) interacts with planet gears (not shown) mounted in the carrier shaft to rotate the output ring gear at a constant speed. Fixed coaxial shaft 29 is disposed around variable coaxial shaft (not shown) such that fixed coaxial shaft 29 is coaxial with variable coax shaft (not shown).

A mounting bracket 33 is attached to output ring gear 34. Accessory drive gear 38 is connected to mounting bracket 33. Hydraulic speed trimming device 28 in conjunction with the differential 40 rotates the output ring gear 34, accessory drive gear 38 and generator driven gear 36 at a constant speed. As shown in FIG. 2, differential 40 can be disposed axially between output ring gear 34 and input driven gear 32. Differential 40 can also mechanically connect input driven gear 32 to variable coaxial shaft (not shown) which is concentric with the fixed coaxial shaft 29. Output ring gear 34 can be disposed between differential 40 and accessory drive gear 38. Accessory drive gear 38, output ring gear 34, and input driven gear 32 can be coaxial and can all be disposed on the same side or end of hydraulic speed trimming device 28. Coaxially aligning accessory drive gear 38, output ring gear 34, and input driven gear 32 within IDG 10 can help reduce the overall size of IDG 10. Positioning accessory drive gear 38, output ring gear 34, and input driven gear 32 on the same side or end of hydraulic speed trimming device 28 reduces the total size of the IDG 10 while ensuring the variable input speed is trimmed to output a fixed speed for output ring gear 34. Should an operator need to inspect or perform maintenance on accessory drive gear 38, output ring gear 34, and input driven gear 32, the operator need only remove a portion of housing assembly 12, such as input housing 14, to access accessory drive gear 38, generator driven gear 36, and input driven gear 32.

Generator driven gear 36 meshes with output ring gear 34 such that output ring gear 34 rotates generator driven gear 36 at a constant speed. Generator driven gear 36 is connected to a rotor (not shown) of generator 26 which rotates at a constant speed due to the interaction of output ring gear 34 and generator driven gear 36. Generator 26 can be an alternating current electrical generator.

Accessory drive gear 38 can mesh with pump gear 44 such that accessory drive gear 38 rotates pump gear 44 at a constant speed. Pump gear 44 is connected to pump drive shaft 47 such that pump drive shaft 47 rotates in unison with pump gear 44. The rotation of pump drive shaft 47 spins pump interior components 49 of pump assembly 42 such that pump assembly 42 can circulate oil within IDG 10, out of IDG 10 through oil outlet 22, and back into IDG 10 through oil inlet 24. As discussed below with reference to FIGS. 3-6, pump sleeve 48 at least partially houses pump interior components 49 of pump assembly 42 into a relatively compact unit that is relatively simple to install inside housing assembly 12 of IDG 10.

Figure 3:
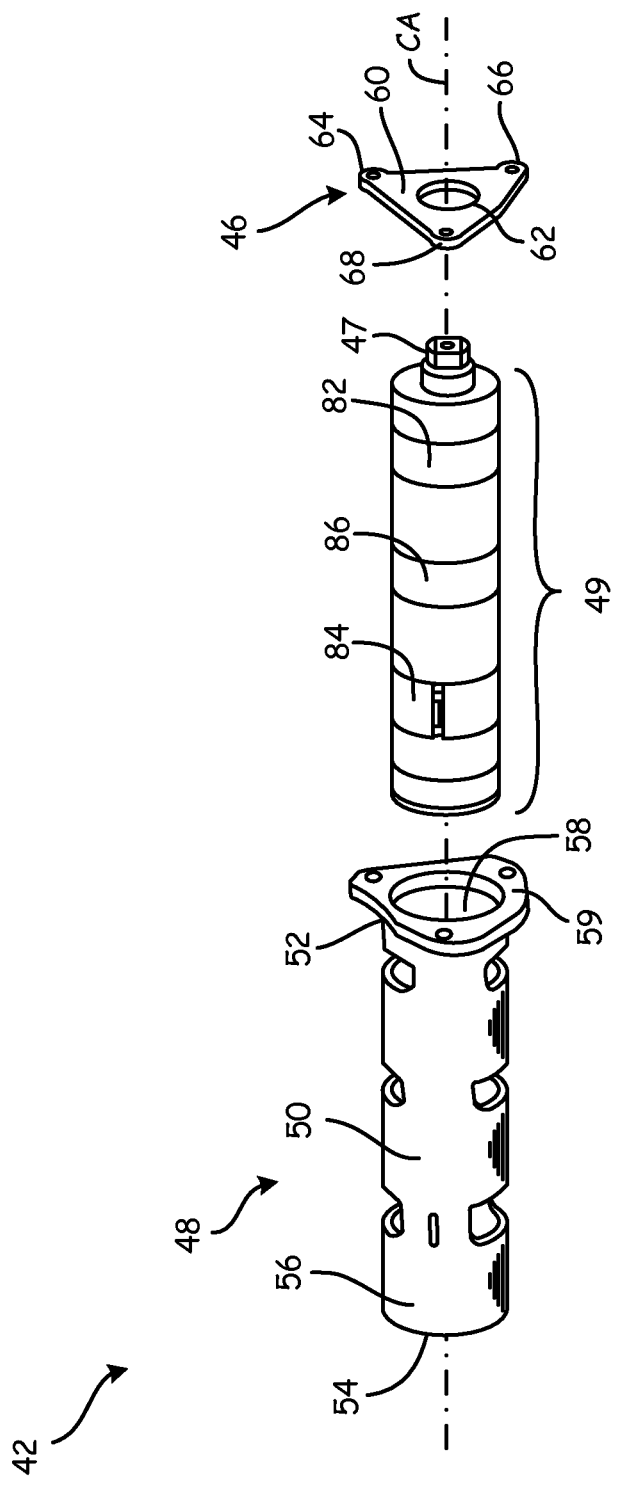
FIG. 3 is an exploded view of a pump assembly from the integrated drive generator of FIG. 2.
Figure 4:
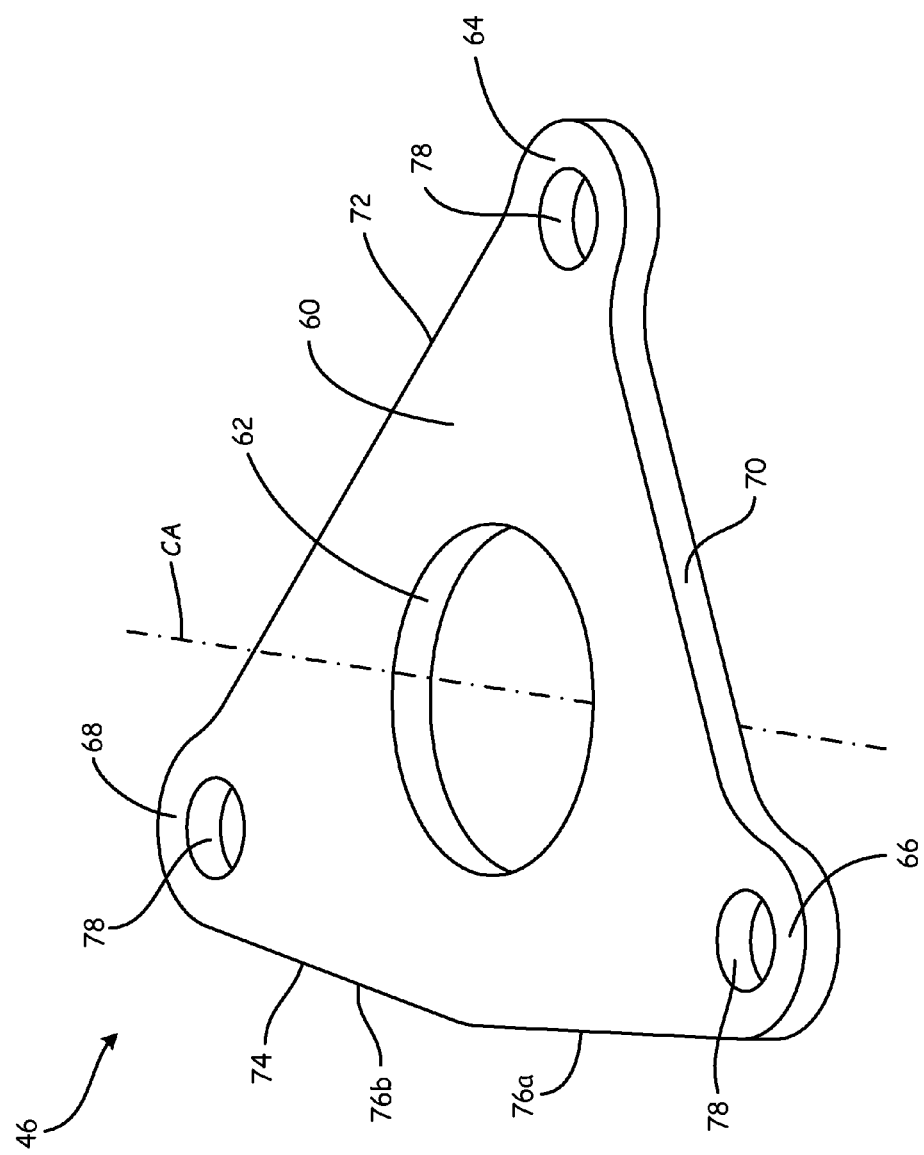
FIG. 4 is a perspective view of the pump cover of FIG. 3.
Figure 5:
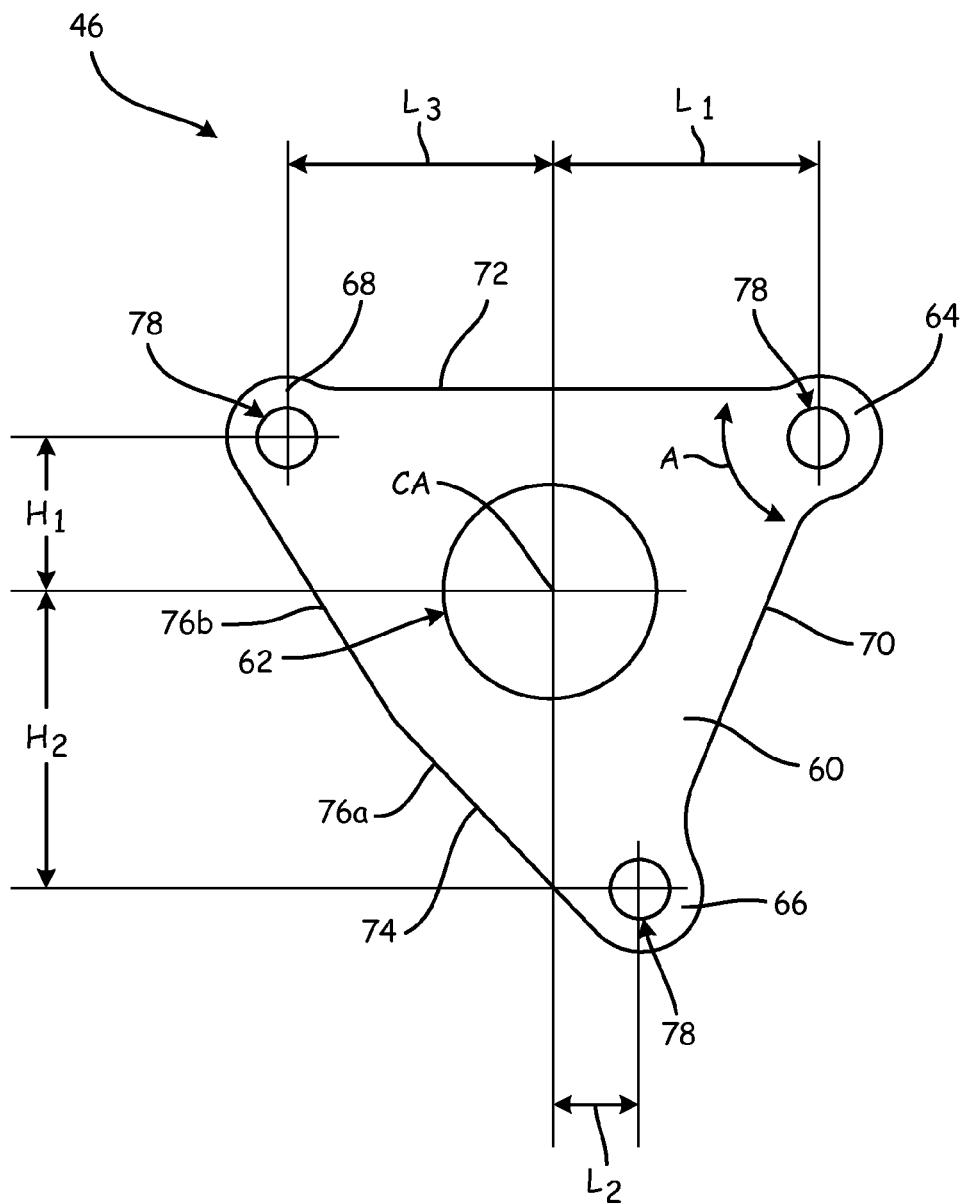
FIG. 5 is a plan view of the pump cover of FIG. 3

FIGS. 3-5 will be discussed concurrently. FIG. 3 is an exploded view of pump assembly 42 along center axis CA of pump assembly 42. As shown in FIG. 3, pump cover 46, pump sleeve 48, and pump interior components 49 all share center axis CA. FIG. 4 is a perspective view of pump cover 46 of FIG. 3, and FIG. 5 is a plan view of pump cover 46 of FIG. 3. As shown in FIGS. 3-5, pump cover 46 can include plate 60, center hole 62, first lobe 64, second lobe 66, third lobe 68, first edge 70, second edge 72, third edge 74 with first plane 76a and second plane 76b, mounting bosses and thru-holes 78, angle A, and center axis CA. As shown in FIGS. 3, pump sleeve 48 can include tubular body 50. Tubular body 50 can include first end 52, second end 54, outside surface 56, inside surface 58, and center axis CA. First end 52 of tubular body 50 can include mounting flange 59 to help connect the entire pump assembly 42 to IDG 10. As also shown in FIG. 3, pump interior components 49 can include charge pump section 82, scavenge pump section 84, and inversion pump section 86.

Tubular body 50 extends from first end 52 to second end 54 along center axis CA. Center axis CA can be the center axis for tubular body 50, pump sleeve 48, pump cover 46 and the rest pump assembly 42. Pump sleeve 48 can be formed from metal material, such as steel, titanium, aluminum, alloys, super alloys, and/or other various types of metals. First end 52 of tubular body 50 can be open such that charge pump section 82, scavenge pump 84, and inversion pump 86 can be inserted into pump sleeve 48 to form a stack of pumps inside pump sleeve 48.

Each of charge pump 82, scavenge pump 84, and inversion pump 86 can individually be a rotary vane pump. When pump interior components 49 are assembled within pump sleeve 48, as shown in FIG. 3, inversion pump 86 is disposed axially between scavenge pump 84 and charge pump 82, with scavenge pump 84 disposed proximate second end 54 of tubular body 50 and charge pump 82 disposed proximate first end 52 of tubular body 50.

Pump cover 46 is removably connected to mounting flange 59 on first end 52 of tubular body 50 to retain charge pump 82, scavenge pump 84, and inversion pump 86 within pump sleeve 48. Keeping charge pump 82, scavenge pump 84, and inversion pump 86 retained and tightly stacked within pump sleeve 48 helps reduce vibration, wear, and fluid flow inefficiency of pump assembly 42. With the use of fasteners, mounting flange 59 and pump cover 46 can be used to connect pump assembly 42 to interior walls (not shown) formed on center housing 16 of housing assembly 12 (shown in FIG. 1).

Pump drive shaft 47 is connected to charge pump 82, scavenge pump 84, and inversion pump 86 and can extend through pump cover 46 to connect with pump gear 44, as shown in FIG. 2. During operation, pump drive shaft 47 rotates the internal vanes of the charge, inversion, and scavenge pumps at a constant speed.

As shown in FIGS. 3-5, pump cover 46 can be manufactured from plate 60. Plate 60 is relatively flat and thin and can have a thickness of about 0.084 inches (0.213 cm) to about 0.104 inches (0.264 cm). Plate 60 can be manufactured from metal material, such as steel, titanium, aluminum, alloys, super alloys, and/or other various types of metals. To accommodate pump drive shaft 47, center hole 62 can be machined in plate 60 and positioned on center axis CA of pump cover 46 and pump assembly 42. Plate 60 of pump cover 46 can be generally triangular in shape to correspond with the geometry of mounting flange 59 of pump sleeve 48. First lobe 64, second lobe 66, and third lobe 68 can each be positioned on one of the three corners of the generally triangular shape of pump cover 46. First lobe 64, second lobe 66, and third lobe 68 contain enough material to allow one of thru-holes 78 to be formed in each of first lobe 64, second lobe 66, and third lobe 68. Thru-holes 78 are sized to accommodate fasteners (shown in FIG. 2) for connecting pump cover 46 to pump sleeve 48 and for connecting pump cover 46 and pump sleeve 48 to housing assembly 12 of IDG 10. Each of thru-holes 78 can have the same diameter as one another and each of thru-holes 78 can be smaller in diameter than center hole 62. For example, center hole 62 can have a diameter of about 0.755 inches (1.917 cm) to about 0.775 inches (1.968 cm), while each of thru-holes 78 can have a diameter of about 0.209 inches (0.530 cm) to about 0.229 inches (0.582 cm).

First edge 70 of plate 60 can extend between first lobe 64 and second lobe 66. Second edge 72 of plate 60 can extend between first lobe 64 and third lobe 68. As shown in FIGS. 3-5, both first edge 70 and second edge 72 can be straight. Third edge 74 of plate 60 can extend between second lobe 66 and third lobe 68. Third edge 74 can include first plane 76a and second plane 76b which meet at an angle approximately midway between second lobe 66 and third lobe 68 such that third edge 74 is bent away from center hole 62 on a plane of plate 60. The distance between center axis CA and the location where first plane 76a and second plane 76b meet can have a nominal value of 0.720 inches (1.828 cm). First plane 76a and second plane 76b enlarge plate 60 of pump cover 46 sufficiently to allow pump cover 46 to fit over the entire opening of first end 52 of pump sleeve 48. Furthermore, third edge 74 can be longer in length than first edge 70 and second edge 72, and second edge 72 can be longer in length than first edge 70. First edge 70 and second edge 72 of plate 60 can be positioned relative center axis CA such that at the shortest distance between first edge 70 of plate 60 and center axis CA can be equal to the shortest distance between second edge 72 of plate 60 and center axis CA. Second edge 72 can be positioned at angle A from first edge 70. In one example, the value of the shortest distance between center axis CA and first edge 70 and the nominal value of the shortest distance between center axis CA and second edge 72 can both be equal to 0.720 inches (1.828 cm). Angle A can be approximately 66 degrees to approximately 70 degrees.

As shown in FIG. 5, a center of thru-hole 78 in first lobe 64 can be spaced from center axis CA by length $L_1$ in a direction generally parallel to second edge 72. A center of thru-hole 78 in second lobe 66 can be spaced from center axis CA by length $L_2$ in the direction generally parallel to second edge 72. A center of thru-hole 78 in third lobe 68 can be spaced from center axis CA by length $L_3$ in the direction generally parallel to second edge 72. Length $L_1$ can be equal to length $L_3$, and $L_2$ can be smaller than $L_1$ and $L_3$. For example, length $L_1$ and length $L_3$ can be nominally 0.947 inches (2.405 cm) in length, and length $L_2$ can be nominally 0.306 inches (0.777 cm) in length. Both $L_1$ and $L_2$ can extend in a direction opposite from $L_3$. The center of thru-hole 78 in third lobe 68 can also be spaced from center axis CA by distance $H_1$ in a direction perpendicular to second edge 72. The center of thru-hole 78 in second lobe 66 can be spaced from center axis CA by distance $H_2$ in the direction perpendicular to second edge 72. Distance $H_1$ can be smaller than distance $H_2$. For example, distance $H_1$ can have a nominal value of 0.547 inches (1.389 cm), and distance $H_2$ can have a nominal value of 1.050 inches (2.667 cm).

In view of the foregoing description, it will be recognized that the present disclosure provides numerous advantages and benefits. For example, the present disclosure provides IDG 10 with pump assembly 42 with charge pump 82, scavenge pump 84, and inversion pump 86 all disposed within pump sleeve 48. Charge pump 82, scavenge pump 84, and inversion pump 86 can all be installed into IDG 10 by simply connecting pump cover 46 and mounting flange 59 of pump sleeve 48 within housing assembly 12 of IDG 10. Thus pump assembly 42 and IDG 10 overall use fewer fasteners and less area than IDG designs. Furthermore, aligning charge pump 82, scavenge pump 84, and inversion pump 86 within pump sleeve 48 and pump cover 46 provides for fewer gears and other moving parts within IDG 10. Reducing the number of gears and other moving parts within IDG 10 increases the service life of IDG 10 by reducing the amount of internal vibration within IDG 10 and the wear and tear associated with internal vibration.

The following are non-exclusive descriptions of possible embodiments of the present invention.

In one embodiment, a cover with a center axis for a pump assembly includes a plate. A center hole is formed in the plate and positioned on the center axis of the cover. A first edge of the plate extends between a first lobe and a second lobe, a second edge of the plate extends between the first lobe and a third lobe, and a third edge of the plate extends between the second lobe and the third lobe. The first, second, and third lobes each comprise a mounting boss with a thru-hole.

The cover of the preceding paragraph can optionally include, additionally and/or alternatively, any one or more of the following features, configurations and/or additional components:

the first edge and the second edge are straight;

the third edge is bent away from the center hole on a plane of the plate;

the third edge is longer in length than the first edge;

the second edge is longer in length than the first edge;

the first edge and the second edge of the plate are positioned equidistant from the center axis; and/or the plate of the cover is generally triangular in shape.

In another embodiment, a pump assembly includes a tubular body extending from a first end to a second end along a center axis, the first end of the tubular body being open. A plurality of pumps is disposed within the tubular body. The pump assembly also includes a cover connected to the first end. The cover includes a plate and a center hole formed in the plate and positioned on the center axis of the tubular body. A first edge of the plate extends between a first lobe and a second lobe, and a second edge of the plate extends between the first lobe and a third lobe. A third edge of the plate extends between the second lobe and the third lobe. The first, second, and third lobes each comprise a mounting boss with a thru-hole.

The pump assembly of the preceding paragraph can optionally include, additionally and/or alternatively, any one or more of the following features, configurations and/or additional components:

a drive shaft connected to at least one of the plurality of pumps and extending through the center hole of the plate of the cover;

the first edge and the second edge are straight;

the plate of the cover is generally triangular in shape;

the third edge is bent away from the center hole on a plane of the plate;

the second edge is positioned at an angle of;

the third edge is longer in length than the first edge; and/or the second edge is longer in length than the first edge.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 3-5 show center hole 62 of pump cover 46 as being circular, center hole 62 can be of any shape that accommodates pump drive shaft 47 and allows pump drive shaft 47 to rotate. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A cover with a center axis for a pump assembly comprising:
   a plate;
   a center hole formed in the plate and positioned on the center axis of the cover;
   a first edge of the plate extending between a first lobe and a second lobe;
   a second edge of the plate extending between the first lobe and a third lobe; and
   a third edge of the plate extending between the second lobe and the third lobe,
   wherein the first, second, and third lobes each comprise a mounting boss with a thru-hole,
   wherein the first edge and the second edge are straight, and
   wherein the third edge is bent away from the center hole on a plane of the plate.

2. The cover of claim 1, wherein the third edge is longer in length than the first edge.

3. The cover of claim 2, wherein the second edge is longer in length than the first edge.

4. The pump assembly of claim 3, wherein the first edge and the second edge of the plate are positioned equidistant from the center axis.

5. The cover of claim 1, wherein the plate of the cover is generally triangular in shape.

6. A pump assembly comprising:
   a tubular body extending from a first end to a second end along a center axis, wherein the first end is open;
   a plurality of pumps disposed within the tubular body; and
   a cover connected to the first end, wherein the cover comprises:
      a plate;
      a center hole formed in the plate and positioned on the center axis of the tubular body;
      a first edge of the plate extending between a first lobe and a second lobe;
      a second edge of the plate extending between the first lobe and a third lobe; and
      a third edge of the plate extending between the second lobe and the third lobe,
      wherein the first, second, and third lobes each comprise a mounting boss with a thru-hole,
      wherein the first edge and the second edge are straight, and
      wherein the third edge is bent away from the center hole on a plane of the plate.

7. The pump assembly of claim 6 further comprising:
   a drive shaft connected to at least one of the plurality of pumps and extending through the center hole of the plate of the cover.

8. The pump assembly of claim 6, wherein the plate of the cover is generally triangular in shape.

9. The pump assembly of claim 8, wherein the second edge is positioned at an angle of approximately 66 degrees to approximately 70 degrees from the first edge.

10. The pump assembly of claim 9, wherein the third edge is longer in length than the first edge.

11. The pump assembly of claim 10, wherein the second edge is longer in length than the first edge.

* * * * *